United States Patent [19]

Naruo

[11] Patent Number: 4,931,711
[45] Date of Patent: Jun. 5, 1990

[54] INDUSTRIAL ROBOT CONTROL APPARATUS

[75] Inventor: Hatsumi Naruo, Oume, Japan

[73] Assignee: Fanuc Ltd, Minamitsuru, Japan

[21] Appl. No.: 350,709

[22] PCT Filed: Sep. 14, 1988

[86] PCT No.: PCT/JP88/00938

§ 371 Date: Apr. 28, 1989

§ 102(e) Date: Apr. 28, 1989

[87] PCT Pub. No.: WO89/02811

PCT Pub. Date: Apr. 6, 1989

[30] Foreign Application Priority Data

Sep. 22, 1987 [JP] Japan .................. 62-238125

[51] Int. Cl.⁵ .......................................... G05B 19/42
[52] U.S. Cl. ............................... 318/568.13; 318/628; 318/112; 364/513; 901/20; 901/23
[58] Field of Search ..................... 318/630–636, 318/560–577; 364/513; 901/1–38, 50

[56] References Cited

U.S. PATENT DOCUMENTS

| | | | |
|---|---|---|---|
| 4,476,954 | 10/1984 | Johnson et al. | 318/628 X |
| 4,510,574 | 4/1985 | Guittet et al. | 318/628 X |
| 4,602,195 | 7/1986 | Eberle et al. | 318/112 X |
| 4,737,697 | 4/1988 | Maruo et al. | 318/568.13 |

Primary Examiner—William M. Shoop, Jr.
Assistant Examiner—Paul Ip
Attorney, Agent, or Firm—Staas & Halsey

[57] ABSTRACT

An industrial robot control apparatus for teaching an industrial robot and operating the robot in accordance with the teaching comprises a teaching handle (9) having a teaching switch (10), and a brake release switch (11) and a sequence control circuit (1). When the operator grips the teaching handle (9), the brake release switch (11) is activated, whereby a servo amplifier (6) is brought to an emergency stop condition in response to a signal from the switch, and a dynamic brake and a mechanical brake are released.

4 Claims, 1 Drawing Sheet

INDUSTRIAL ROBOT CONTROL APPARATUS

TECHNICAL FIELD

The present invention relates to an industrial robot control apparatus for controlling paint robots and the like, and more particularly, to an industrial robot control apparatus able to carry out a safe, accurate teaching of a robot.

BACKGROUND ART

To operate a paint robot or the like, the operator holds a paint gun, teaches the required movements of the gun to the robot, and causes the robot to store the taught movements and to carry out the painting process in accordance with those stored movements. During the teaching operation, vectors of force are detected by a force sensor attached to the distal end of a robot arm, and are decoded by a control apparatus, which then causes the robot to act in the directions of the vectors.

In this system, however, since the robot is controlled by the control apparatus, an incorrect operation by the operator or a malfunction of the robot control apparatus may place the operator in danger, despite the low speed of the operation.

Further, since the robot is operated in the directions of the vectors of force detected as described above, the reactions of the robot during the operation are very slow, and thus a delicate positioning movement and accurate teaching are difficult.

DISCLOSURE OF THE INVENTION

The object of the present invention is to provide an industrial robot control apparatus which solves these problems, and is able to carry out a safe, accurate teaching of a robot.

To solve the aforementioned problems, according to the present invention, there is provided an industrial robot control apparatus for teaching an industrial robot and operating the robot in accordance with the teaching, which comprises a teaching handle having a teaching switch and a brake release switch, a sequence control circuit able to bring a servo amplifier to an emergency stop condition, to thereby release a dynamic brake of a servomotor and release a brake, in response to a signal from the brake release switch, and a teaching memory means for storing taught positions through the operation of the teaching switch.

According to the present invention, to begin a teaching operation, first the operator grips the teaching handle, whereby the brake release switch is activated and the servo amplifier is brought to an emergency stop condition in response to a signal from the switch, so that an output from the servo amplifier to the servomotor is cut off, and thus the servomotor is in a dynamically braked state.

Namely, the sequence control circuit releases the dynamic brake, and also releases the brake.

Accordingly, the operator is able to operate the robot as desired and teach required movements to the robot, and the robot stores the taught positions through operation of the teaching switch.

BEST MODE OF CARRYING OUT THE INVENTION

One embodiment of the present invention will now be described with reference to the drawings.

Figure 1:
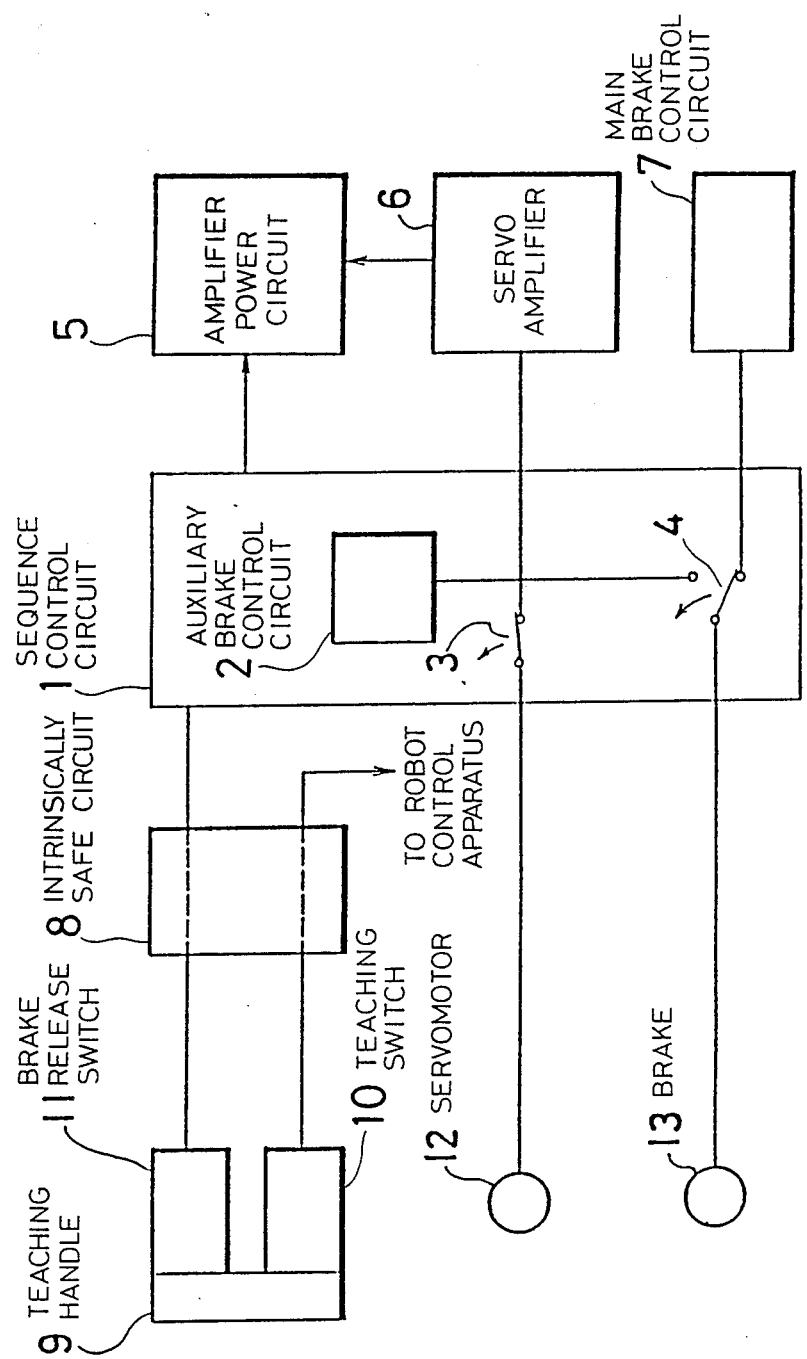
FIG. 1 is a block diagram of an industrial robot control apparatus according to one embodiment of the present invention.

FIG. 1 shows a block diagram of an industrial robot control apparatus according to one embodiment of the present invention. In FIG. 1, numeral 1 denotes a sequence control circuit for controlling output to a servomotor and the like; 2 denotes an auxiliary brake control circuit which supplies power to a brake, described later; 3 denotes a relay for disconnecting a dynamic brake of the servomotor; 4 denotes a relay for switching the brake control to an automatic or manual mode; 5 denotes an amplifier power circuit which supplies power to a servo amplifier 6; 7 denotes a main brake control circuit for controlling the brake; and 8 denotes an intrinsically safe circuit, which lowers the voltage, current, etc., of signal lines below the level at which arcing will occur, to prevent explosions caused by an ignition of an evaporated solvent in a paint robot or the like, caused by sparking at electrical contacts therein.

Numeral 9 denotes a teaching handle provided with a teaching switch 10 and a brake release switch 11. When teaching required movements to the robot, the teaching switch 10 is operated at a certain point and the robot control apparatus then stores this point. To carry out the teaching operation, the operator grips the teaching handle 9 to activate the brake release switch 11 and release the brake described later. The teaching handle 9, the teaching switch 10, and the brake release switch 11 will be described in detail later.

Numeral 12 denotes a servomotor for driving the robot. Although about three to six servomotors are actually used, only one is shown and the others are omitted for simplicity. Numeral 13 denotes a brake, which is used to brake the shaft of the servomotor or a robot-side rotating shaft. As in the case of the servomotors 12, although each servomotor 12 is provided with a brake 13, only one of the brakes 13 is shown and the others are omitted for simplicity. The brake 13 is released when an electric current is supplied thereto, and operated when the electric current supply is cut off.

Figure 2:
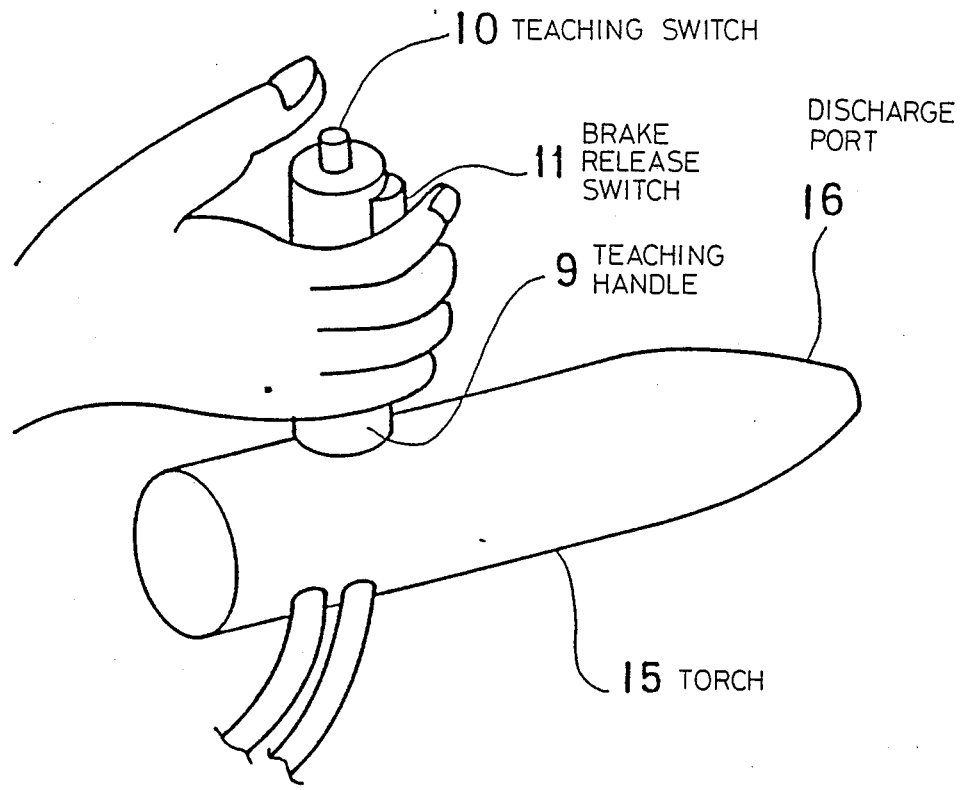
FIG. 2 is a diagram showing details of a teaching handle.

FIG. 2 shows details of the teaching handle. In FIG. 2, numeral 9 denotes the teaching handle, which is fixed to a torch 15, and 10 denotes the teaching switch. During the teaching process, the operator depresses the teaching switch 10 at a certain point and this taught point is stored in the robot control apparatus. Numeral 11 denotes the brake release switch 11. To start the teaching process, the operator grips the teaching handle 9 and the brake release switch 11 is then activated by the pressure of the operator's grip. Numeral 16 denotes a paint discharge port.

Namely, when the operator grips the teaching handle 9 to start the teaching process, the brake release switch 11 is activated to bring the servo amplifier 6 to an emergency stop condition, and thus the teaching process can be carried out safely and easily.

The control of the sequence control circuit 1 when carrying out the teaching process will be described with reference to FIG. 1. When the operator grips the teaching handle 9 to start the teaching process, the brake release switch 11 is activated and a signal is output to the sequence control circuit 1, which then sends an emergency stop signal to the amplifier power circuit 5. The amplifier power circuit 5 then stops the supply of power to the servo amplifier 6, and thus a control current supplied by the servo amplifier 6 to the servomotor 12 is cut off.

When the amplifier power circuit 5 is brought to an emergency stop condition, the servo amplifier 6 brings the servomotor 12 to a dynamically braked state. This is achieved by short-circuiting the windings of the servomotor 12, by a resistor inside the servo amplifier 6. At this time, however, since an arm of the robot is in a dynamically braked state, a large resistance is imposed during operation of the robot arm. To remedy this situation, the sequence control circuit 1 turns off the relay 3, to thereby release the dynamic braking of the servomotor 12.

At this point, since the main brake control circuit 7 is in an emergency stop condition, the current flow to the brake 13 is cut off to release the brake. At this time, the arm of the robot cannot be moved, and thus the relay 4 is switched to allow manual control and is connected to the auxiliary brake control circuit, whereby current is supplied from the auxiliary brake control circuit to release the brake.

In this state, the current flow to the servomotor is cut off, and thus the arm of the robot cannot move and endanger the operator. Further, since the dynamic brake and the brake are released, the operator can safely and accurately carry out the teaching process by depressing the teaching switch 10 at each teaching point, whereby the taught point is memorized by the robot control apparatus.

According to the present invention, as described above, the control apparatus side is brought to an emergency stop condition by activating the brake release switch of the teaching handle, to thereby cut off the output to the servomotor and release the dynamic brake and the brake, and thus the teaching process can be carried out safely and accurately.

I claim:

1. An industrial robot control apparatus for teaching an industrial robot and operating the robot in accordance with the teaching, comprising:
   a teaching handle having a teaching switch and a brake release switch;
   a servomotor;
   dynamic brake means for said servomotor;
   a mechanical brake for said servomotor, said mechanical brake being released when an electrical current is supplied thereto and operated when the electric current is shut off;
   a servo amplifier;
   a sequence control circuit operable to bring said servo amplifier to a stop condition and to release said dynamic brake and said mechanical brake in response to a signal from said brake release switch; and
   teaching memory means for storing taught positions through the operation of said teaching switch.

2. An industrial robot control apparatus according to claim 1, wherein said brake release switch is activated when an operator grips the teaching handle.

3. An industrial robot control apparatus according to claim 1, which includes an auxiliary brake control circuit for supplying electric current to said mechanical brake to release said mechanical brake in response to said signal from said brake release switch.

4. An industrial robot control apparatus according to claim 1, which includes an intrinsically safe circuit for lowering the voltage and current of signal lines below the level at which arcing will occur.

* * * * *